US010942875B2

(12) United States Patent
Armangau et al.

(10) Patent No.: US 10,942,875 B2
(45) Date of Patent: Mar. 9, 2021

(54) SYSTEM AND METHOD FOR REGULATING HOST IOS AND INTERNAL BACKGROUND OPERATIONS IN A STORAGE SYSTEM

(71) Applicant: EMC IP Holding Company, LLC, Hopkinton, MA (US)

(72) Inventors: Philippe Armangau, Acton, MA (US); Vamsi Vankamamidi, Hopkinton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/530,761

(22) Filed: Aug. 2, 2019

(65) Prior Publication Data

US 2021/0034556 A1 Feb. 4, 2021

(51) Int. Cl.
  *G06F 13/20* (2006.01)
  *G06F 11/34* (2006.01)
  *G06F 11/30* (2006.01)

(52) U.S. Cl.
  CPC .......... *G06F 13/20* (2013.01); *G06F 11/3041* (2013.01); *G06F 11/3485* (2013.01)

(58) Field of Classification Search
  CPC ... G06F 13/20; G06F 11/3041; G06F 11/3485
  See application file for complete search history.

(56) References Cited

U.S. PATENT DOCUMENTS

| 8,898,385 B2* | 11/2014 | Jayaraman | G06F 13/12 711/114 |
| 2005/0114562 A1* | 5/2005 | Barnes | G06F 13/00 710/29 |
| 2013/0031200 A1* | 1/2013 | Gulati | H04L 65/80 709/213 |
| 2013/0326064 A1* | 12/2013 | Gulati | G06F 9/5061 709/226 |
| 2016/0103774 A1* | 4/2016 | Bradbury | G06F 9/45558 710/33 |
| 2017/0351591 A1* | 12/2017 | Crawford | G06F 11/2094 |

* cited by examiner

*Primary Examiner* — Henry Tsai
*Assistant Examiner* — John B Roche
(74) *Attorney, Agent, or Firm* — Brian J. Colandreo; Mark H. Whittenberger; Holland & Knight LLP

(57) ABSTRACT

A method, computer program product, and computer system for monitoring host IO latency. It may be identified that a rate of the host IO latency is at a one of a plurality of levels. At least one of a rate of background IOs and a rate of host IOs may be regulated based upon, at least in part, the rate of the host IO latency being at the one of the plurality of levels.

20 Claims, 6 Drawing Sheets

SYSTEM AND METHOD FOR REGULATING HOST IOS AND INTERNAL BACKGROUND OPERATIONS IN A STORAGE SYSTEM

BACKGROUND

Mapper, as an example only, may generally be described as a log structured storage system. Consequently, all writes may be to new log locations and old locations may need to be tracked for garbage collection, which may be performed in the background. Similarly, Mapper features such as snapshots and deduplication, which may cause block sharing in the Map, may require tree (map) traversal to figure out reclaimable space whenever a volume or a snapshot is deleted. This may also be a background operation referred to generally as trash bin processing. Drive rebuilds may also be an operation performed by Mapper in the background. All of these background operations may be resource intensive in both the CPU and storage device IOs. They may deal with host IOs, and thereby may impact performance.

BRIEF SUMMARY OF DISCLOSURE

In one example implementation, a method, performed by one or more computing devices, may include but is not limited to monitoring host IO latency. It may be identified that a rate of the host IO latency is at one of a plurality of levels. At least one of a rate of background IOs and a rate of host IOs may be regulated based upon, at least in part, the rate of the host IO latency being at the one of the plurality of levels.

One or more of the following example features may be included. The rate of the background IOs may be regulated based on a deviation around normalized mean calibrated host IO latency when the rate of the host IO latency is at a first level of the one of the plurality of levels. The rate of the background IOs may be regulated based on a background application performing the background IOs when the rate of the host IO latency is at a second level of the one of the plurality of levels. The rate of the background IOs for all background applications performing the background IOs may be set to a minimum rate when the rate of the host IO latency is at a third level of the one of the plurality of levels. The rate of the host IOs may be regulated when the rate of the host IO latency is at a fourth level of the one of the plurality of levels. The rate of one of the background IOs and the rate of host IOs may be regulated based on a Quality of Service metric. A calibration latency of the host IO latency may be determined.

In another example implementation, a computing system may include one or more processors and one or more memories configured to perform operations that may include but are not limited to monitoring host IO latency. It may be identified that a rate of the host IO latency is at one of a plurality of levels. At least one of a rate of background IOs and a rate of host IOs may be regulated based upon, at least in part, the rate of the host IO latency being at the one of the plurality of levels.

One or more of the following example features may be included. The rate of the background IOs may be regulated based on a deviation around normalized mean calibrated host IO latency when the rate of the host IO latency is at a first level of the one of the plurality of levels. The rate of the background IOs may be regulated based on a background application performing the background IOs when the rate of the host IO latency is at a second level of the one of the plurality of levels. The rate of the background IOs for all background applications performing the background IOs may be set to a minimum rate when the rate of the host IO latency is at a third level of the one of the plurality of levels. The rate of the host IOs may be regulated when the rate of the host IO latency is at a fourth level of the one of the plurality of levels. The rate of one of the background IOs and the rate of host IOs may be regulated based on a Quality of Service metric. A calibration latency of the host IO latency may be determined.

In another example implementation, a computer program product may reside on a computer readable storage medium having a plurality of instructions stored thereon which, when executed across one or more processors, may cause at least a portion of the one or more processors to perform operations that may include but are not limited to monitoring host IO latency. It may be identified that a rate of the host IO latency is at one of a plurality of levels. At least one of a rate of background IOs and a rate of host IOs may be regulated based upon, at least in part, the rate of the host IO latency being at the one of the plurality of levels.

One or more of the following example features may be included. The rate of the background IOs may be regulated based on a deviation around normalized mean calibrated host IO latency when the rate of the host IO latency is at a first level of the one of the plurality of levels. The rate of the background IOs may be regulated based on a background application performing the background IOs when the rate of the host IO latency is at a second level of the one of the plurality of levels. The rate of the background IOs for all background applications performing the background IOs may be set to a minimum rate when the rate of the host IO latency is at a third level of the one of the plurality of levels. The rate of the host IOs may be regulated when the rate of the host IO latency is at a fourth level of the one of the plurality of levels. The rate of one of the background IOs and the rate of host IOs may be regulated based on a Quality of Service metric. A calibration latency of the host IO latency may be determined.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
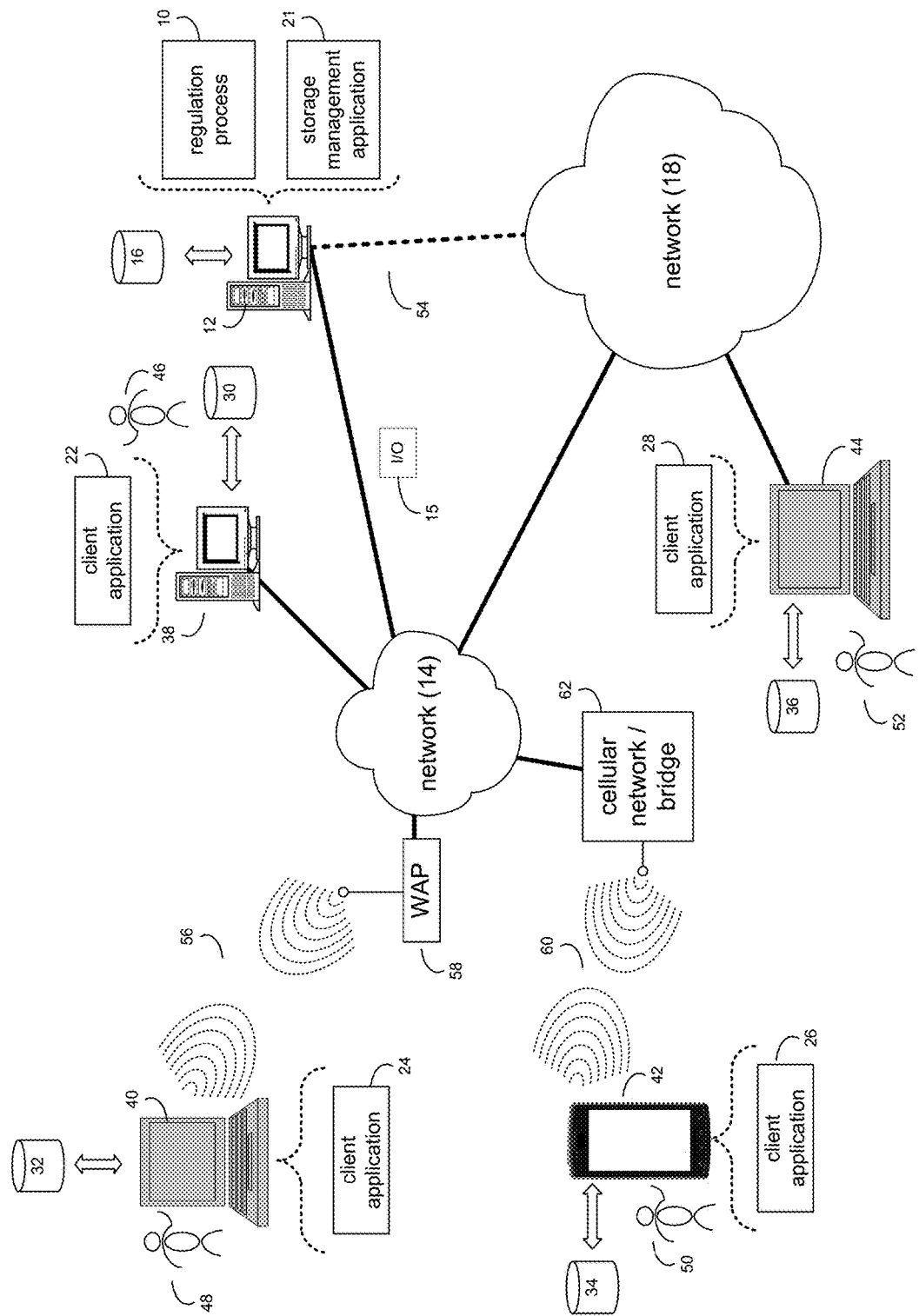
FIG. 1 is an example diagrammatic view of a regulation process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown regulation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a regulation process, such as regulation process 10 of FIG. 1, may monitor host IO latency. It may be identified that a rate of the host IO latency is at a one of a plurality of levels. At least one of a rate of background IOs and a rate of host IOs may be regulated based upon, at least in part, the rate of the host IO latency being at the one of the plurality of levels.

In some implementations, the instruction sets and subroutines of regulation process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, regulation process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, regulation process 10 and/or storage management application 21 may be accessed via one or more of client applications 22, 24, 26, 28. In some implementations, regulation process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within regulation process 10, a component of regulation process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of regulation process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android®, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of regulation process 10 (and vice versa). Accordingly, in some implementations, regulation process 10 may be a purely server-side application, a purely client-side application, or a hybrid server-side/client-side application that is cooperatively executed by one or more of client applications 22, 24, 26, 28 and/or regulation process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, regulation process 10, and storage management application 21, taken singly or in any combination, may effectuate some or all of the same functionality, any description of effectuating such functionality via one or more of client applications 22, 24, 26, 28, regulation process 10, storage management application 21, or combination thereof, and any described interaction(s) between one or more of client applications 22, 24, 26, 28, regulation process 10, storage management application 21, or combination thereof to effectuate such functionality, should be taken as an example only and not to limit the scope of the disclosure.

In some implementations, one or more of users 46, 48, 50, 52 may access computer 12 and regulation process 10 (e.g., using one or more of client electronic devices 38, 40, 42, 44) directly through network 14 or through secondary network 18. Further, computer 12 may be connected to network 14 through secondary network 18, as illustrated with phantom link line 54. Regulation process 10 may include one or more user interfaces, such as browsers and textual or graphical user interfaces, through which users 46, 48, 50, 52 may access regulation process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
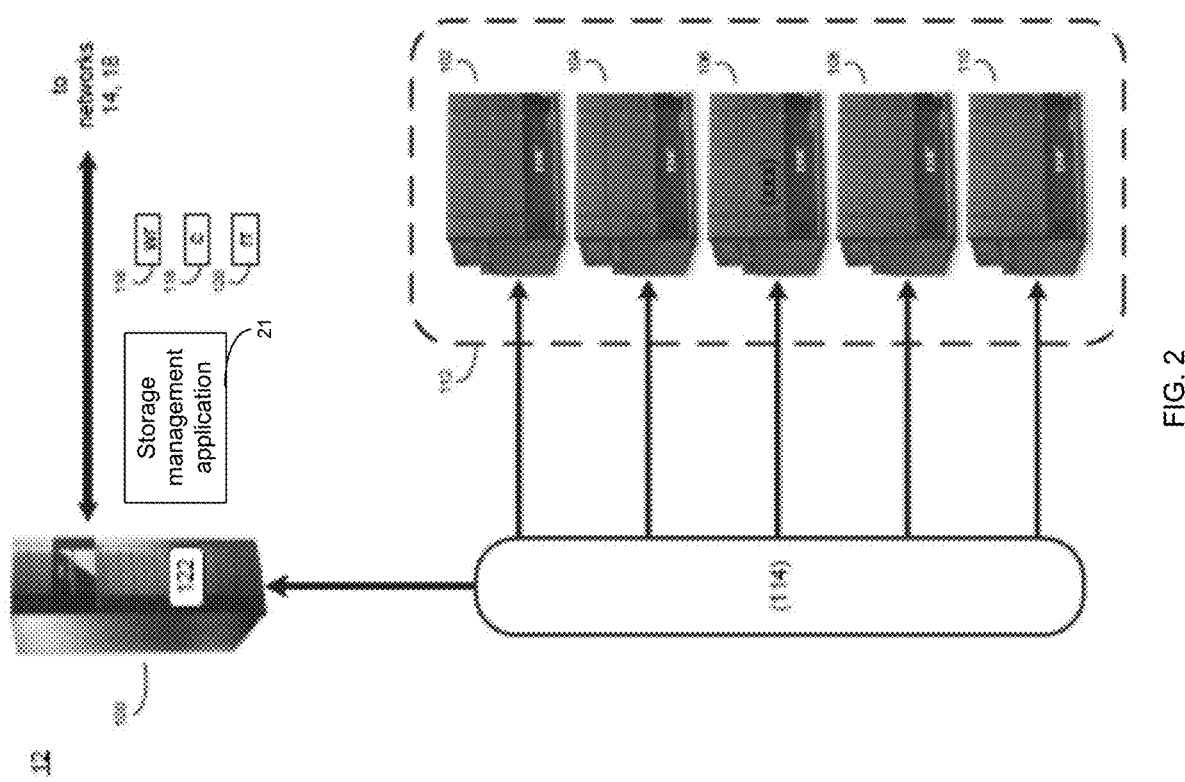
FIG. 2 is an example diagrammatic view of a storage system of FIG. 1 according to one or more example implementations of the disclosure.
Figure 3:
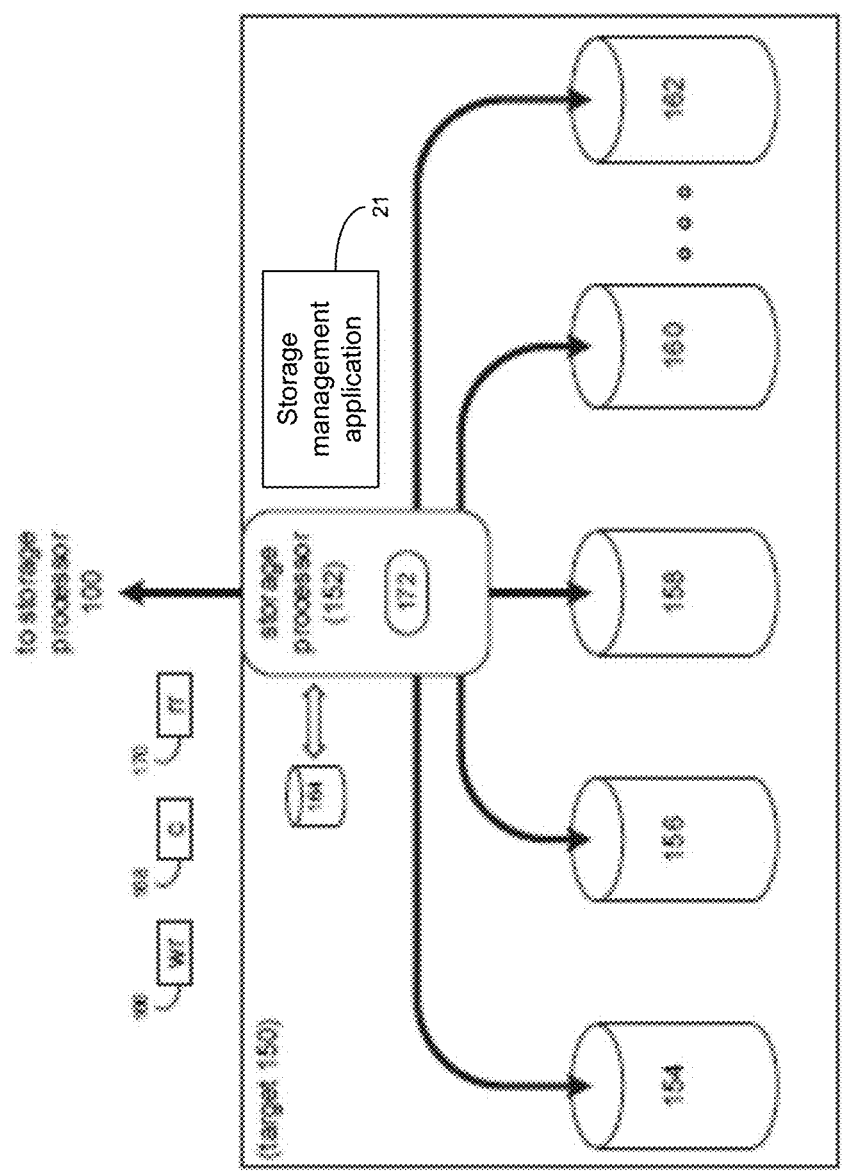
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or regulation process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™ VNX™ or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, Mapper, as an example only, may generally be described as a log structured storage system. Consequently, all writes may be to new log locations and old locations may need to be tracked for garbage collection, which may be performed in the background. Similarly, Mapper features such as snapshots and deduplication, which may cause block sharing in the Map, may require tree (map) traversal to figure out reclaimable space whenever a volume or a snapshot is deleted. This may also be a background operation referred to generally as trash bin processing. Drive rebuilds may also be an operation performed by Mapper in the background. All of these background operations may be resource intensive in both the CPU and storage device IOs. They may deal with host IOs, and thereby may impact performance.

Generally, in current solutions to this issue, there may not be much coordination between scheduling of host IO operations and Mapper's background operations. As a result, the system may exhibit unpredictable behavior when there is contention between host IOs and background operations. For example, if a host IO scheduler is measuring host IO latency, and if it starts going up, then the host IO may be throttled, which may reduce the latency of the host IOs. This throttling of host IOs may improve the latency on Mapper's background operations, which may in turn ramp-up the number of background operations. This is a feedback loop, which may severely affect performance of the system. As such, as will be discussed below, it may be at least this example and non-limiting "split-brain" behavior that the present disclosure may help to address, by, e.g., determining how and when to regulate internal background operations and host IOs, as well as how to orchestrate scheduling of different background operations based on their dynamic run-time priority and host IO operations based on Quality of Service (QoS) settings in the host volumes.

Figure 4:
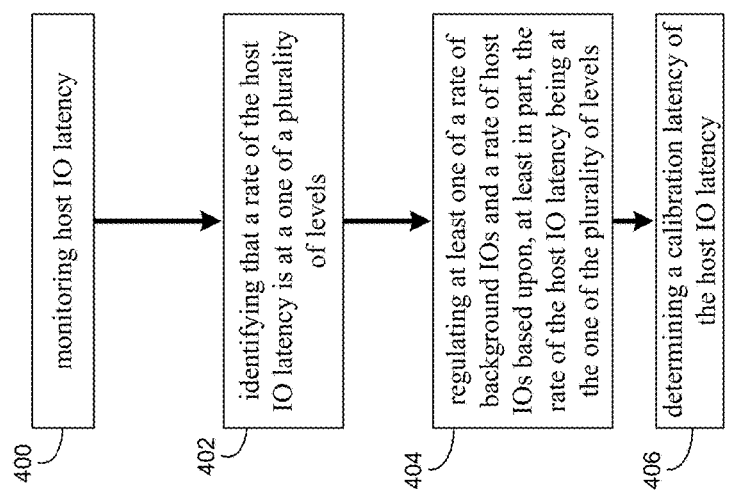
FIG. 4 is an example flowchart of a regulation process according to one or more example implementations of the disclosure.
Figure 5:
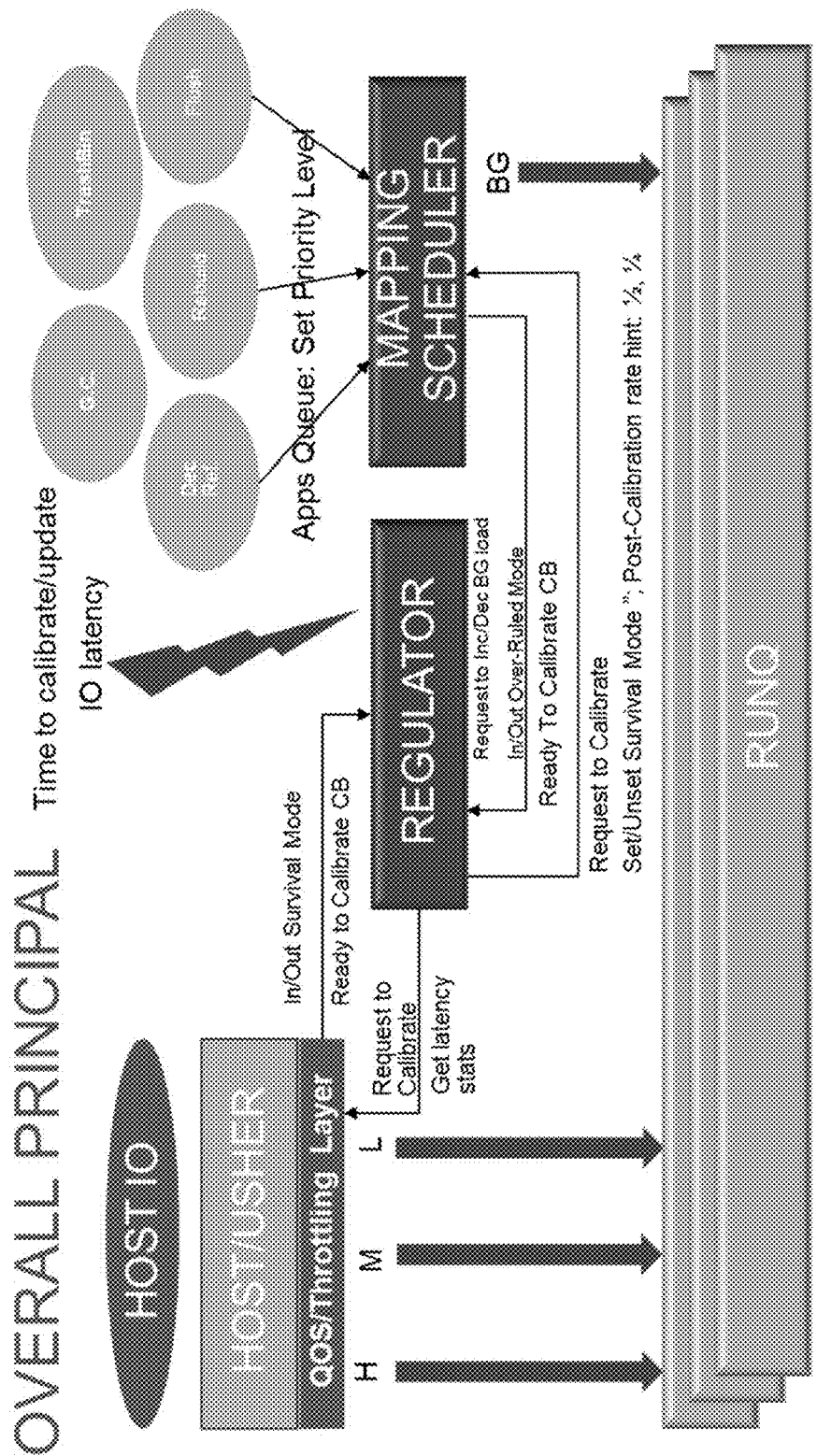
FIG. 5 is an example diagrammatic view of system components of a regulation process according to one or more example implementations of the disclosure.
Figure 6:
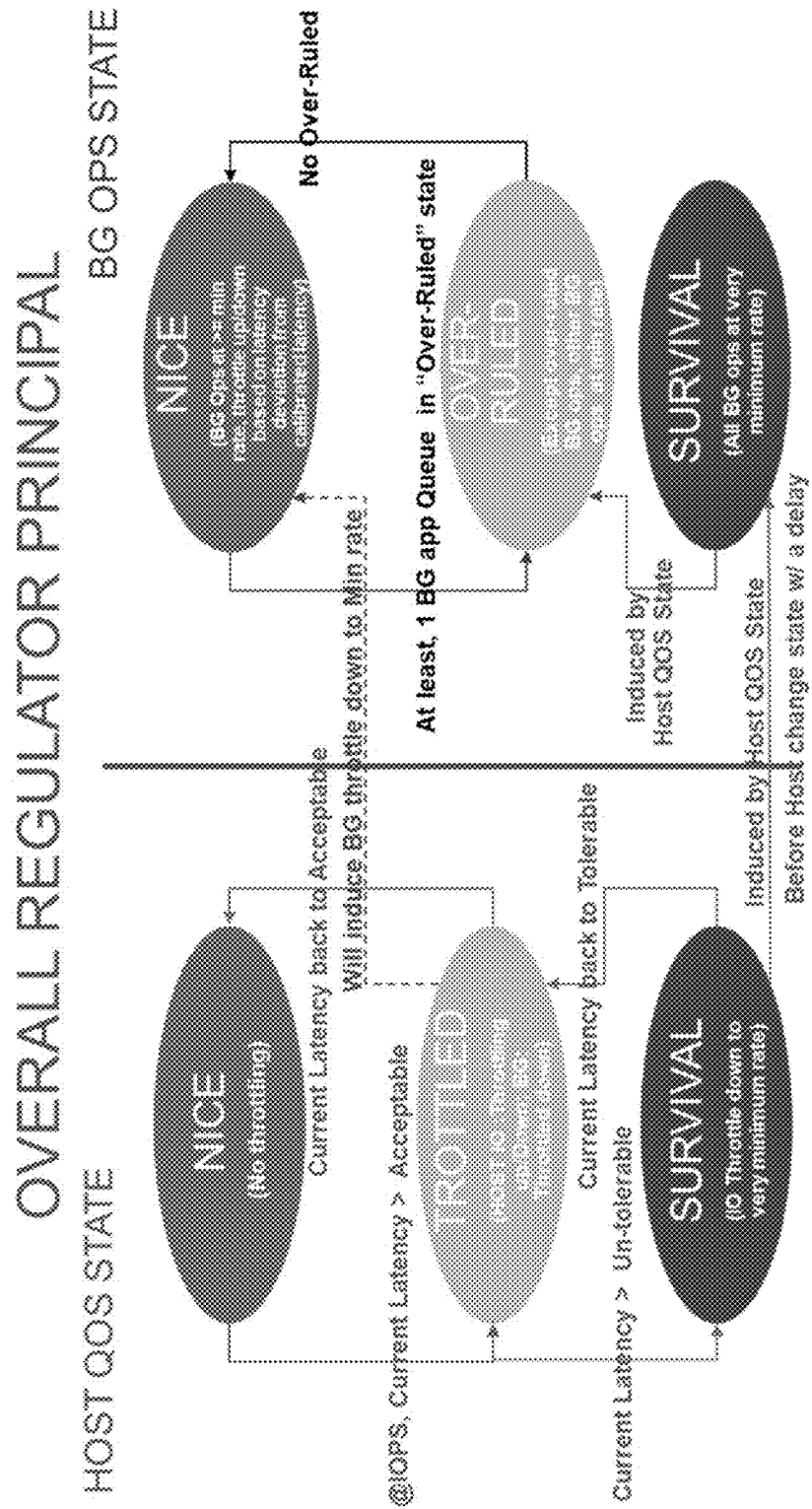
FIG. 6 is an example diagrammatic view of a regulation flow of example states of host quality of service (QoS) states and background operation states according to one or more example implementations of the disclosure.

The Regulation Process:

As discussed above and referring also at least to the example implementations of FIGS. 4-6, regulation process 10 may monitor 400 host IO latency. Regulation process 10 may identify 402 that a rate of the host IO latency is at a one of a plurality of levels. Regulation process 10 may regulate 404 at least one of a rate of background IOs and a rate of host IOs based upon, at least in part, the rate of the host IO latency being at the one of the plurality of levels.

As will be discussed below, and referring at least to the example implementation of FIG. 5, example system 500 components of regulation process 10 are shown. In some implementations, regulation process 10 may monitor 400 host IO latency. The host IO may generally be considered as the IO load from host applications to volumes in the storage system. Different volumes may be configured with different QoS settings based on the requirements of the applications performing the IOs. This in turn may determine the relative priority of host IOs to different volumes. A "regulator" component of regulation process 10 may be responsible for regulating the execution of host IO and internal background operations. Its goal may be to minimize the impact of executing background operations on host IO performance while also making sure that background operations do not back-up to the internal limits of the system. Background operations may be generally considered as the IO load generated by internal background operations such as, e.g., garbage-collection, volume-delete processing, drive rebuilds, etc. Background operations set the priority of the IOs they generate based on their needs which change dynamically. For example, priority of the operations to flush dirty data in cache is medium. But if cache hits high watermark, priority of those operations switch to high. Similarly, drive rebuild operations start as medium priority but if time to finish rebuild is not being met, then priority switches to high.

As will be discussed in greater detail below, regulation process 10 may achieve this by, for example purposes only, distributing scheduling "credits" or tokens to a host IO scheduler (e.g., responsible for selecting volumes and scheduling their IOs based on the QoS settings and fairness to all volumes) and background operation scheduler (responsible for selecting which background operations to scheduled next, based on the priority that background operations have set for their IOs and fairness across all operations) during each scheduling cycle. These schedulers may be responsible for orchestration (e.g., deciding which IOs to schedule based on the scheduling "tokens" available). To decide on scheduling "tokens," regulator process 10 may continuously (or intermittently) measure latency on host IOs. As will be discussed below, in case any background operation is considered critical, then available scheduling tokens may be ignored and that operation may be scheduled anyway. Generally, an executor may be responsible for executing the operations that both schedulers have selected in each scheduling cycle. The executor may have per-core queues into which schedulers enqueue their operations. As long as a CPU core is available for the executor, it may pick the next operation in that core's queue in FIFO order for execution.

In some implementations, regulation process 10 may identify 402 that a rate of the host IO latency is at a one of a plurality of levels, and may regulate 404 at least one of a rate of background IOs and a rate of host IOs based upon, at least in part, the rate of the host IO latency being at the one of the plurality of levels. For example, through monitoring the host IO latency, the rate of the host IO latency may be identified, which may then be used to dictate how the rate of either background IOs and/or host IOs may be regulated. For example, and referring at least to the example implementation of FIG. 6, an example regulation flow 600 of example states of host quality of service (QoS) states and background operation states is shown. In the example, each of the states may be dictated by the host IO latency rate, which may then dictate how IOs are throttled or otherwise regulated to the background operations and/or the host IOs.

For example, in some implementations, regulation process 10 may determine 406 a calibration latency of the host IO latency. For example, the purpose of the calibration may be to determine the current latency when the BG ops are at their minimum allowed load level. This latency is termed its calibrated latency and is used in determining the load allowed for additional BG ops. The minimum BG ops load level is unknown to the QoS regulator (discussed below); only that it has been reached for the purpose of calibration. Calibration may be triggered when, e.g., (1) the time since the last calibration has passed the timeout value (e.g., timeout is 2 seconds; however, may change based on tuning analysis); (2) the current latency exceeds the last calibrated latency by, e.g., 250 usec or 20% of the calibrated latency whichever is greater (however, these values may change based on tuning analysis); and (3) completion of an "urgent" BG op and there are no more "urgent" BG ops (calibration is held-off/aborted while there are "urgent" BG ops).

Calibration may be executed when, e.g., regulator process 10 calls Mapper Scheduler API to "prepare for calibration" with a callback when Mapper Scheduler is "ready for calibration." Mapper Scheduler may be "ready for calibration" when the Mapper BG ops load is at or below the minimum load. During calibration, the Mapper BG load is generally not allowed to exceed the minimum. Regulator calls the API to "prepare for calibration" with a callback when it is "ready for calibration" (e.g., when it is in the Nice mode state). If the QoS is in the throttled mode state, throttling may be reduced by starting two IOs for every IO that completes (for example). Once both are "ready for calibration", calibration may begin and may last for one "Current Latency Period" (which may change based on tuning analysis). During calibration, the number of reads/writes and their latencies may be tracked and used to calculate the calibrated latency when calibration completes.

In some implementations, the rate of the background IOs may be regulated based on a deviation around normalized mean calibrated host IO latency when the rate of the host IO latency is at a first level of the one of the plurality of levels. For example, this "first level" of the host IO latency may generally be referred to as the "Nice Mode" in FIG. 6. Mainly background operations (or BG ops) rates may be regulated based on deviation around Normalized Mean Calibrated Host IO Latency. This means that host IOs are normalized to, e.g., 4 KB IO (combined for Read/Write), e.g., 32 KB IO will be considered as 8×4 KB IO. Both read & write latencies may be tracked to compute the overall latency as follows for example purposes only:

$$Latency = \% \ Read * Read \ Latency + \% \ Write * Write \ Latency$$

$$Normalized \ Mean \ Latency = (previous \ Normalized \ Mean \ Latency * 2 + current \ Normalized \ Latency)/3$$

Normalized Mean Calibrated Host IO Latency may mean:
Calibrated Host Latency: Host Latency @ minimal BG ops rate In some implementations, calibration may occur, e.g., on Timeout (e.g., 5 seconds, or when Normalized Current Latency goes beyond a deviation Δ from Normalized Mean Calibrated Latency, or when Normalized Current Latency goes below a deviation n*Δ from Normalized Mean Calibrated Latency.

In some implementations, calibration may be accomplished, e.g., during a preparation phase, where BG ops are tuned down to a minimum rate, or an execution phase, once BG ops are tuned down to a minimum rate, the latency may be measured for a short period of time. In some implementations, as will be discussed below, if during the calibration preparation phase or during the calibration a queue goes into an OVER-RULE mode (e.g., the "second level" of the host IO latency), the calibration may be aborted. A new calibration may be performed when there is no longer a queue in OVER-RULED mode.

Continuing with the above example, when in the "Nice Mode", if "Normalized Current Latency" of the host IO is within the deviation £, from the Normalized Mean Calibrated Latency, the BG rate may increase or decrease (e.g., increase or decrease factor may vary based on the degree of change in current latency), the request to increase or decrease may be issued to the regulator on "regular interval/ or n*request completion". ε may vary based on Normalized Mean Calibrated Latency (e.g., acceptable change in latency @100 us may be different than the one @3 ms). Generally speaking, in some implementations, if the host is throttled, the BG rate may always decrease. A minimum amount of load (e.g., in units of "Mapping Scheduler Waiters") may be guaranteed for BG ops and may be unevenly distributed across High, Medium, Low (H/M/L) background application queues to give higher priority to H vs. M vs. L. The portion of the quota assigned to a background application's queue may be a minimum load guaranty for that queue, but it may grow more in case other queues are idle.

The portion of the "Nice" maximum quota assigned to a queue may be a minimum load guaranty for that queue, but it may grow more in case other app queues are idle (e.g. if minimum quota load in Nice mode is 12, and maximum quota load is also currently at 12). For example, refer to Table 1 below:

TABLE 1

|  | H | M | L |
|---|---|---|---|
| Minimum | 6 | 4 | 2 |
| Maximum | 12 | 12 | 12 |

The Nice maximum quota load may grow above the minimum based on the current host IO latency. For post calibration BG ops level, if the New Calibrated Latency<Old Calibrated Latency, the BG rates may be set back to "e.g., half" of the load set prior to calibration time, and if the New Calibrated Latency>Old Calibrated Latency, the BG rates may be reset to the Minimum quota (to be tuned).

In some implementations, the rate of the background IOs may be regulated based on a background application performing the background IOs when the rate of the host IO latency is at a second level of the one of the plurality of levels. For example, this "second level" of the host IO latency may generally be referred to as the "OVER-RULED" mode in FIG. 6. This mode may be due to the fact that the application is performing an important or even critical operation (e.g., rebuild, flush, etc.) and must be able to do so. For example, when the Mapping Scheduler Apps Queues are in the "Over-Ruled" state/mode, the amount of load may be basically defined by the application in principal (i.e., the application that is performing the IO). This may be due to the fact that the application is performing an important or even critical operation (e.g., rebuild, flush, etc.) and must be able to do so.

In the example, the amount of over-ruled load may still be limited to, e.g., (MAX System Capacity Load−Minimum Over-Ruled Mode load quota Reserved for H/M/L Queues). Again, the load may be in units of "Mapping Scheduler Waiters." The Max System Capacity Load=Number of NB-Truck*Max Number of Waiters per Core (to be tuned). It will be appreciated that other heuristics, such as the backend capability (e.g., number of drives, the drive type, etc.) may be considered as well.

Regarding the Mapping Scheduler Applications Queues in the above-noted "H/M/L" State, a Minimum Over-Ruled mode Load quota may be reserved for H/M/L applications. The Minimum Over-Ruled Mode Load quota may be unevenly distributed across H/M/L queues to give higher priority to H vs. M vs. L. The portion of the Minimum Over-Ruled Mode Load quota assigned to the applications queue may be a minimum load guaranty for that queue, but it may grow more in case other queues are idle. That is, for example, if Minimum Over-Ruled Mode Load quota reserved=10, then the quota distribution across H/M/L may be as shown in Table 2 below:

TABLE 2

|  | H | M | L |
|---|---|---|---|
| Minimum | 5 | 3 | 2 |
| Maximum | 10 | 10 | 10 |

The rate of the background IOs for all background applications performing the background IOs may be set to a minimum rate when the rate of the host IO latency is at a third level of the one of the plurality of levels. For example, this "third level" of the host IO latency may generally be referred to as the "SURVIVAL" mode in FIG. 6. For example, regardless of the mapping scheduler applications queue states, the load may be limited to a Survival Maximum Quota Load. The Survival Maximum Load quota may be unevenly distributed across O/H/M/L queues, to give higher priority to O vs H vs. M vs. L. The portion of the Survival Maximum quota assigned to a queue may be a minimum load guaranty for that queue only if enough quota remains (e.g., unused by higher priority queues), but it may grow more in case other application queues are idle. That is, for example, if Survival Maximum O/H/M/L Load Quota=8, then the Survival Maximum quota distribution across H/M/L may be as shown in Table 3 below:

TABLE 3

|  | O | H | M | L |
|---|---|---|---|---|
| Minimum | 6 | 3 | 2 | 1 |
| Maximum | 8 | 8 | 8 | 8 |

When regulating host IOs, they may only be throttled if latency becomes intolerable (e.g., >5 sec). Once the host IOs are in survival mode, the BG ops may be set in survival mode as well. Once the host IO latency is back to a more tolerable value (e.g., <2 sec) the host IO mode may switch back to "throttled", and the BG ops may go back to either OVER-RULED or NICE mode depending on the state of the application queues.

In some implementations, the rate of the host IOs may be regulated when the rate of the host IO latency is at a fourth level of the one of the plurality of levels. For example, this "fourth level" of the host IO latency may generally be referred to as the "THROTTLED" mode in FIG. 6. In this mode, host IOs may be throttled only if latency becomes unacceptable (e.g., single value regardless of IOs Per Second (iops) if schedule time permits). Once the host IOs are throttled, the BG ops may be throttled down (slowly but surely) to a "minimum rate".

In some implementations, the rate of one of the background IOs and the rate of host IOs may be regulated based on a Quality of Service metric. For example, as noted above, a "regulator" component of regulation process 10 may be responsible for regulating the execution of host IO and internal background operations. Its goal may be to minimize the impact of executing background operations on host IO performance while also making sure that background operations do not back-up to the internal limits of the system. Regulation process 10 may achieve this by, for example purposes only, distributing scheduling "credits" or tokens (or similar scheme) to a host IO scheduler and background operation scheduler during each scheduling cycle. To decide on scheduling "tokens," regulator process 10 may continuously (or intermittently) measure latency on host IOs. As a general rule, when host IO latency is increasing, the number of "tokens" available for background operations may be trimmed up to a minimum "credit" (e.g., trickle mode). If host IO latency is increasing even when background operations are at minimum token level, the scheduler "credits" to the host IO scheduler may be reduced thereby throttling host IOs. This mechanism may help with reducing the congestion in the data path.

For example, QoS may be a feature of regulation process 10 intended to provide relative Quality of Service (QoS) to volumes based on an assigned priority. This may apply to front-end user IOs and IOs initiated by backend applications. The goal may generally be to make data path (DP) latency more predictable by turning DP resource contention into queuing delay at a higher level and to provide headroom for IO prioritization. QoS (e.g., via regulation process 10) may maintain a pool of tokens (or credits or other similar scheme) corresponding to resources required to issue IOs. Enough tokens must generally be available to issue an IO; otherwise, the IO may be queued until tokens are available. This may operate independently from DP background operations (BG ops); however, there may be a need to coordinate with DP BG ops to achieve maximum benefit.

Regarding the priority queues, a customer may assign a priority classification to each of their volumes/LUNs (e.g., gold, silver, bronze). An IO to a volume may be assigned a priority based on the volume's classification. Three example and non-limiting IO priorities may include: high, medium, low or H, M, L (as discussed above). Regulation process 10 may maintain an IO queue per IO priority per core (separate from the transport run queues). An IO is queued to its corresponding priory queue when QoS (e.g., via regulation process 10) is throttling IOs, and may be queued when tokens required to issue the IO are more than the currently available tokens. The IO may be un-queued when enough tokens become available. If a different priority IO is queued, the IO may be un-queued in priority order using a ratio that avoids starvation (e.g., H:M:L of 32:8:2).

Regarding read/write throttling (as discussed above), QoS maintains a pool of tokens for issuing IO. Each IO is assigned a required number of tokens based on the load the IO is expected to exert on the DP. If the number of tokens in the pool is larger than the number of tokens needed by the IO, the IO may be sent to the DP and the number of tokens remaining in the pool may be reduced; otherwise, the IO may be queued until sufficient number of tokens exist in the pool. When an IO completes, its tokens are added back to the pool. Based on observed latency, the token pool size may be increased or decreased. For example, the pools of tokens is adjusted based on whether the above-noted IO latency is acceptable or not. For instance, and for example purposes only, the maximum latency that may be considered acceptable for an IO is:

Reads: (1+IO size/256 KB)*10 msec

Writes: (1+IO size/16 KB)*10 msec

These formulas and/or values may change based on tuning and other performance profiling.

Referring again to the above-noted token pool, it may be partitioned across the cores that serve the IOs. The number of tokens required for an IO may be based on IO size and type. The intent is to make the "token cost" for an IO represent as close as possible the cost in system resources required to service the IO. The size of the token pool may control the amount of concurrent IOs sent to the DP. If not enough tokens are available to issue an IO, it is queued. New IOs may be automatically queued if there is already an IO queued waiting for tokens.

The amount of load an IO is expected to place on the DP, and thus the number of tokens the IO requires, may be based on the following example and non-limiting premises: (1) Reads exert less load than writes; (2) A base factor indicating an IO exerts at least this amount of load regardless of its size; (3) An inflection point over which the size of the IO matters (e.g., a 4 KB IO and an 8 KB IO may be considered to exert an equivalent amount of load but not so for a 128 KB IO); (4) An inflection scaling factor once the inflection point is surpassed; (5) The example and non-limiting formula for the expected load may be:

The base_factor if the IO size is not past the inflection point

Else the base_factor+(IO size−inflection_size)*scaling_factor

Reads: base_factor=6, inflection_size_kb=64, scaling_factor=1/64

Writes: base_factor=22, inflection_size_kb=8, scaling_factor=2

These formulas and/or values may change based on tuning and other performance profiling.

In some implementations, there may be exceptions to above mentioned mode behaviors. For instance, if background operations are backing-up to the internal limits in the system, then the above-noted scheduler of background operations may go above the number of scheduling "tokens" made available by regulation process 10. This causes latency on host IO to increase and thereby causing throttling of the host IO. This is a desired behavior. Consider the following use cases as an example:

If dirty-cache (Logger) hits high-water-mark, then flush of dirty data is as important or more important than host writes as those host writes will still pend in cache for Flushes to complete and generate some clean pages. Similarly, there may be internal limits on how many volume-deletes may be deferred, how decrement reference counts may be deferred, and rebuilds may need to be prioritized based on mean-time-to-failure of second drives.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   monitoring host input/output (IO) latency associated with processing host IOs received from host computing devices, on a storage system;
   identifying that a rate of the host IO latency is at one of a plurality of levels; and
   regulating a rate of background IOs and a rate of host IOs of the storage system based upon, at least in part, the rate of the host IO latency being at the one of the plurality of levels, wherein the background IOs include IOs generated by internal background operations associated with the storage system, wherein regulating the rate of background IOs includes regulating a number of tokens distributed to a background operation scheduler and wherein regulating the rate of host IOs includes regulating a number of tokens distributed to a host IO scheduler.

2. The computer-implemented method of claim 1 wherein the rate of the background IOs is regulated based on a deviation around normalized mean calibrated host IO latency when the rate of the host IO latency is at a first level of the one of the plurality of levels.

3. The computer-implemented method of claim 2 wherein the rate of the background IOs is regulated based on a background application performing the background IOs when the rate of the host IO latency is at a second level of the one of the plurality of levels.

4. The computer-implemented method of claim 3 wherein the rate of the background IOs for all background applications performing the background IOs is set to a minimum rate when the rate of the host IO latency is at a third level of the one of the plurality of levels.

5. The computer-implemented method of claim 4 wherein the rate of the host IOs is regulated when the rate of the host IO latency is at a fourth level of the one of the plurality of levels.

6. The computer-implemented method of claim 1 wherein the rate of one of the background IOs and the rate of host IOs is regulated based on a Quality of Service metric.

7. The computer-implemented method of claim 1 further comprising determining a calibration latency of the host IO latency.

8. A computer program product residing on a non-transitory computer readable storage medium having a plurality of instructions stored thereon which, when executed across one or more processors, causes at least a portion of the one or more processors to perform operations comprising:
   monitoring host input/output (IO) latency associated with processing host IOs received from host computing devices, on a storage system;
   identifying that a rate of the host IO latency is at one of a plurality of levels; and
   regulating a rate of background IOs and a rate of host IOs of the storage system based upon, at least in part, the rate of the host IO latency being at the one of the plurality of levels, wherein the background IOs include IOs generated by internal background operations associated with the storage system, wherein regulating the rate of background IOs includes regulating a number of tokens distributed to a background operation scheduler and wherein regulating the rate of host IOs includes regulating a number of tokens distributed to a host IO scheduler.

9. The computer program product of claim 8 wherein the rate of the background IOs is regulated based on a deviation around normalized mean calibrated host IO latency when the rate of the host IO latency is at a first level of the one of the plurality of levels.

10. The computer program product of claim 9 wherein the rate of the background IOs is regulated based on a background application performing the background IOs when the rate of the host IO latency is at a second level of the one of the plurality of levels.

11. The computer program product of claim 10 wherein the rate of the background IOs for all background applications performing the background IOs is set to a minimum rate when the rate of the host IO latency is at a third level of the one of the plurality of levels.

12. The computer program product of claim 11 wherein the rate of the host IOs is regulated when the rate of the host IO latency is at a fourth level of the one of the plurality of levels.

13. The computer program product of claim 8 wherein the rate of one of the background IOs and the rate of host IOs is regulated based on a Quality of Service metric.

14. The computer program product of claim 8 wherein the operations further comprise determining a calibration latency of the host IO latency.

15. A computing system including one or more processors and one or more memories configured to perform operations comprising:
   monitoring host input/output (IO) latency associated with processing host IOs received from host computing devices, on a storage system;
   identifying that a rate of the host IO latency is at one of a plurality of levels; and
   regulating a rate of background IOs and a rate of host IOs of the storage system based upon, at least in part, the rate of the host IO latency being at the one of the plurality of levels, wherein the background IOs include IOs generated by internal background operations associated with the storage system, wherein regulating the rate of background IOs includes regulating a number of tokens distributed to a background operation scheduler and wherein regulating the rate of host IOs includes regulating a number of tokens distributed to a host IO scheduler.

16. The computing system of claim 15 wherein the rate of the background IOs is regulated based on a deviation around normalized mean calibrated host IO latency when the rate of the host IO latency is at a first level of the one of the plurality of levels.

17. The computing system of claim 16 wherein the rate of the background IOs is regulated based on a background application performing the background IOs when the rate of the host IO latency is at a second level of the one of the plurality of levels.

18. The computing system of claim 17 wherein the rate of the background IOs for all background applications performing the background IOs is set to a minimum rate when the rate of the host IO latency is at a third level of the one of the plurality of levels.

19. The computing system of claim 18 wherein the rate of the host IOs is regulated when the rate of the host IO latency is at a fourth level of the one of the plurality of levels.

20. The computing system of claim 15 wherein the rate of one of the background IOs and the rate of host IOs is regulated based on a Quality of Service metric, wherein the operations further comprise determining a calibration latency of the host IO latency.

\* \* \* \* \*